March 1, 1949. O. A. WIBERG 2,463,340
AXIAL FLOW TURBINE BLADE STRUCTURE
Filed Nov. 15, 1945
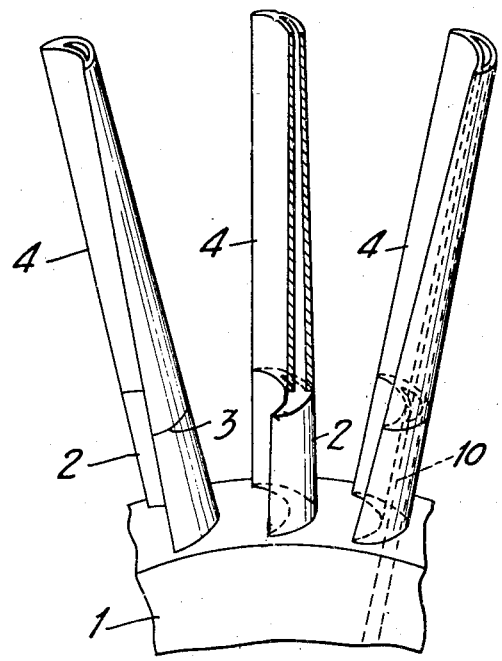
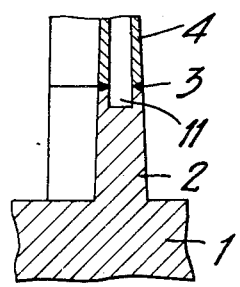
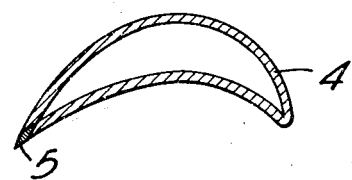
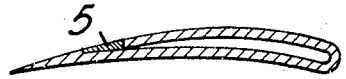
Inventor
Oscar A. Wiberg
by Sommers & Young
Attorneys Patented Mar. 1, 1949

2,463,340

UNITED STATES PATENT OFFICE 2,463,340

AXIAL FLOW TURBINE BLADE STRUCTURE

Oscar Anton Wiberg, Finspong, Sweden

Application November 15, 1945, Serial No. 628,748
In Sweden February 22, 1945

3 Claims. (Cl. 60—41)

This invention relates to axial flow elastic fluid turbines, compressors or similar machines and has for its object to provide an improved blade structure for the rotors of such machines.

Owing to the high speed at which rotors of this class run, both the roots of the blades of the rotors and their fastenings are subjected to high stresses under the action of the centrifugal force. This is true particularly in respect of the low pressure sections of the machines where the blades are comparatively long. In order to reduce these stresses it is already known to make the blades hollow, either by manufacturing the blades of sheet metal plates which are properly curved and welded together or by forming cavities in solid blades.

The present invention has reference more particularly to blades of the said first-mentioned type. According to the invention, however, only a portion of the blade is hollow, the invention being characterized, chiefly, by the fact that the blade comprises a solid or substantially solid member formed integrally with or rigidly connected to the rotor body, and a hollow member, as for instance made of sheet metal, connected by welding to said solid member so as to form a longitudinal extension thereof.

Because of the fact that the welding operation takes place at the end surface of a blade member projecting from the circumference of the rotor body, heat resulting from the welding operation cannot reach the rotor body with such a high temperature as to cause detrimental internal stresses therein.

In the accompanying drawing Fig. 1 is a perspective view of a portion of a rotor body provided with blades according to an embodiment of the invention. Fig. 2 is a radial section of part of such a blade. Figs. 3–5 illustrate some blade profiles of hollow blades.

With reference to Figs. 1 and 2, the numeral 1 designates a portion of a rotor body having a set of short integral blade members 2 radially projecting from its circumferential surface. To each of these blade members is fastened, by a welded joint 3, a hollow blade member 4. This hollow blade member may comprise, as shown in Figs. 3 and 4, a sheet metal plate curved in conformity with the blade profile desired and the same as that of the blade members 2. The edges of the plates are welded together, as shown at 5.

As an alternative, which may be preferred in case of so called "twisted blades," the hollow blade member may comprise two sheet metal plates 6, 7, Fig. 5, representing the front and back surface, respectively, of the blade which are welded together, as shown at 8, 9.

Though not illustrated, the hollow blade member 4 may be formed from a pipe pressed to the shape of a blade, or from a solid blade member formed with a cavity.

For cooling purposes, the cavity of the hollow blade member may be in communication with a cooling fluid passage 10 in the solid blade member 2 which in its turn is in communication with a cooling system in the rotor, as indicated at the extreme right hand blade of Fig. 1.

In all the embodiments described the thickness of the sheet metal material of the hollow member of the blade may decrease towards the free end of the blade.

As indicated at 11 in Fig. 2, the solid blade member may be formed with a recess in its free end, the cross section of which agrees with that of the cavity of the hollow blade member. By this means, the thickness of material will be substantially the same on both sides of the welded joint 3, so that approximately the same temperature may be obtained on both sides, that is to say, there is no risk of burning down the sheet metal material when performing the welding operation.

What I claim is:

1. In a machine of the class described in combination, a rotor, a composite blade structure comprising a substantially solid base member formed integrally with the rotor while projecting substantially radially from the circumference thereof, and a hollow member welded by its bottom end to the top end of said base member so as to form a longitudinal extension thereof, both of said members being of blade profile with the top surface of the base member corresponding to the bottom surface of the hollow member.

2. In a machine of the class described in combination, a rotor, a composite blade structure comprising a substantially solid base member formed integrally with the rotor while projecting substantially radially from the circumference thereof, and a hollow sheet metal member welded by its bottom end to the top end of said base member, both of said members being of blade profile with the top surface of the base member corresponding to the bottom surface of the hollow members, said hollow member comprising at least one curved sheet metal plate the abutting longitudinal edges of which are welded together so as to surround a longitudinally extending cavity.

3. In a machine of the class described in combination, a rotor, a composite blade structure comprising a substantially solid base member formed integrally with the rotor while projecting substantially radially from the circumference thereof, and a hollow member welded by its bottom end to the top end of said base member both of said members being of blade profile with the top surface of the base portion corresponding to the bottom surface of the hollow blade member, said base member being formed with a cooling fluid passage communicating at the outer end of the base member with the cavity of the hollow blade member.

OSCAR ANTON WIBERG.

REFERENCES CITED

The following references are of record in the file of this patent:

UNITED STATES PATENTS

| Number | Name | Date |
|---|---|---|
| 1,530,249 | Eveleth | Mar. 17, 1925 |
| 1,829,179 | Back | Oct. 27, 1931 |
| 1,966,104 | Noack | July 10, 1934 |
| 2,220,420 | Meyer | Nov. 5, 1940 |
| 2,347,034 | Doran | Apr. 18, 1944 |

FOREIGN PATENTS

| Number | Country | Date |
|---|---|---|
| 214,461 | Switzerland | July 16, 1941 |
| 218,177 | Switzerland | Mar. 2, 1942 |
| 380,497 | Italy | 1940 |
| 543,985 | Great Britain | Mar. 23, 1942 |
| 847,942 | France | July 17, 1939 |